United States Patent [19]
Stankovic et al.

[11] Patent Number: 5,724,310
[45] Date of Patent: Mar. 3, 1998

[54] TRAVELTIME GENERATION IN THE PRESENCE OF VELOCITY DISCONTINUITIES

[75] Inventors: Goran Milan Stankovic; Uwe Karsten Albertin, both of Houston, Tex.

[73] Assignee: Western Atlas International, Inc., Houston, Tex.

[21] Appl. No.: 730,221

[22] Filed: Oct. 15, 1996

[51] Int. Cl.[6] .................................. G01V 1/28; G01V 1/30
[52] U.S. Cl. ............................... 367/51; 367/53; 367/73
[58] Field of Search .............................. 367/50, 51, 52, 367/53, 73; 364/421

[56] References Cited

U.S. PATENT DOCUMENTS

| | | | |
|---|---|---|---|
| 5,067,113 | 11/1991 | Hanson et al. | 367/50 |
| 5,157,637 | 10/1992 | Wang | 367/50 |
| 5,229,938 | 7/1993 | Wang et al. | 364/421 |
| 5,265,068 | 11/1993 | Wang et al. | 367/73 |

*Primary Examiner*—Ian J. Lobo
*Attorney, Agent, or Firm*—William A. Knox

[57] ABSTRACT

An array of output image points is distributed over a velocity model of a subsurface region of interest. A fan of rays is shot from each of a plurality of acoustic source points along the surface, the angular separation between the rays being equal to $\pi/n$, where n is the number of rays. A family of traveltime wavefronts is erected at selected time intervals, $\Delta t$, along the ray trajectories. The resulting wavefront map is superimposed over the array of output image points. Sub-arrays of output image points will lie within discrete traveltime cells, the widths of which are defined by the separation between adjacent rays paths and the heights are defined by the wavefront separation distance. Ray segments, wavefront segments and output image points are identified by a velocity layer index. A velocity interface that may cut across a traveltime cell, divides the cell into two parts, each having a different layer index. The traveltime to be assigned to a selected output image point is determined by projection from a nearby wavefront segment that has the same layer index as that of the output image point.

9 Claims, 4 Drawing Sheets

TRAVELTIME GENERATION IN THE PRESENCE OF VELOCITY DISCONTINUITIES

BACKGROUND OF THE INVENTION

1. Field of the Invention

A method for calculating a wavefront travel time to be assigned to the respective ones of a plurality of selected output grid coordinates by projection of travel times from sparsely-distributed, known ray-path trajectories in the presence of a velocity discontinuity such as a salt diapir.

2. Discussion of Related Art

In one form of geophysical exploration for natural resources, a seismic wavefield is radiated from a source point at or near the surface of the earth. Initially propagating as a spherically expanding wavefront, the wavefield insonifies the various earth layers which usually offer an acoustic impedance mismatch at the layer boundaries due to variations in rock density and acoustic velocity. The wavefield is reflected from the respective layer boundaries to return to the surface where the mechanical earth motions due to the reflected wavefield are converted to electrical signals. The signals which comprise the seismic data, are stored on archival storage media for future processing.

It is the object of seismic studies to produce a model of a volume of subsurface earth formations over an assigned area to be surveyed in a region of geological and/or economic interest. For an isotropic horizontal stratum with constant velocity, the elapsed time between wavefield emission and reception at a receiver near the source, multiplied by half the average velocity, is the depth of the point of incidence of the reflected wavefield on the stratum that lies directly beneath the midpoint between the source and receiver.

If a reflector is tilted or the velocity is spatially variable, that simple relationship no longer holds; the incident point is shifted laterally up-dip relative to the source/receiver midpoint. Proper mapping of dipping or tilted reflectors, requires migration of the wavefields originating from those dipping strata. One well-known preferred migration technique is Kirchhoff depth migration.

The computation of wavefield travel times at selected output points is a key element in successful Kirchhoff depth migration of seismic data. For complex geology, wavefield travel times to the output points are preferably generated by ray tracing from the source. Ray-traced travel-time generation methods are preferred because they can produce travel times for all wavefront arrivals at an output point.

By way of review, a velocity model of a region of interest is provided. A first ray is shot at a first selected angle from a source into a velocity model. The ray is traced through all of the intervening earth layers via pathways determined by the well-known Snell's-law refraction effects at the velocity discontinuities that characterize the layer boundaries and continuous velocity changes that characterize the layers. Given the velocity sequence which is known from the velocity model, the travel time of the wavefront of a radiated wavefield may be computed at any point along the ray path. A second and additional rays, directed at second and additional selected angles relative to the surface are shot from the source. A wavefront envelope at any given instant, for use in migration, can be reconstructed by joining the loci corresponding to equal travel times as measured along the respective ray segments. By definition, the wavefront is perpendicular to the ray trajectory. In actual field operations, many source locations are occupied within the survey area.

Although Snell's-law calculations are straight-forward, they are necessarily time consuming even for simple layering because of the multiple trigonometric solutions required. In a typical survey, many hundreds of thousands of output points are involved. Computation of an individual trajectory for each output point would be prohibitively expensive of computer time. Accordingly, only a relatively few ray-path trajectories are computed at sparsely-distributed shooting angles. Travel times to individual output or image points are calculated by simple projection (interpolation or extrapolation) from the known but sparsely-distributed ray paths.

One such method is taught by U.S. Pat. 5,229,938, issued Jul. 20, 1993 to Shein-Shen Wang et al. Here is taught a method for obtaining two-way travel times for source and receiver pairs that includes the steps of determining a set of one way travel times for each source to a plurality of image points and a set of one way travel times for each receiver to a plurality of image points. Ray sets are generated for both sources and receivers. Travel times from a source position to image points are computed by two point interpolation using the ray sets. Two way travel time is computed by summing two sets, one set each for the source and receiver positions. A two way travel time set is obtained for a particular source and receiver combination for all imaging points.

U.S. Pat. 5,265,068, issued Nov. 23, 1993 to Shein S. Wang et al. teaches a method for efficiently generating travel time tables for an expanding wavefront propagating through a complex velocity model. The model is plotted as closed-area cells within the model on a two-dimensional grid. The travel time is calculated to each grid point within a given cell, which cell is associated with a given velocity structure. The travel time tables are generated for use with various data processes such as depth migration.

U.S. Pat. No. 5,067,113, issued Nov. 19, 1991 to D. W. Hansen et al. describes a method for generating travel time tables for application in depth migration. A velocity model including a plurality of velocities in multiple earth layers is plotted on a two-dimensional grid. A travel time to a first layer boundary is determined. Travel times from the source on each layer boundary to the grid points above the next reflector are determined. For the initial iteration, the layer boundary is the surface and the source is the actual source used in generating the seismic data. For layers below the surface there will be more than one source or secondary source. The actual determinations of travel times for these lower layers may be done by comparing the travel times to all points on the first reflector. The minimum travel time is selected as the true travel time to the first reflector. Next all points where the reflector intersect the grid are found. Using these intersection points, the traveltimes to the second reflector may be generated in a similar manner, determining the travel times from a predetermined point on the reflector to the second reflector.

SUMMARY OF THE INVENTION

None of the presently known travel time generators above cited address the problem of the projection, i.e., by interpolation or extrapolation, of a wavefront travel time along a known ray trajectory to an image point in a regular grid in the presence of a velocity discontinuity that exists in an otherwise uniform velocity domain.

In accordance with this invention, a velocity model as function of depth, including one or more velocity discontinuities is provided. The boundaries of these velocity discontinuities form domains within the model. A plurality of image points is plotted along a regular grid, having preselected dimensions, over the velocity model. Each image point is identified by a layer index according to the velocity domain in which it resides. A fan of rays is shot from a surface source position, along sparsely-distributed trajectories having an angular separation of $\pi/n$ radians where n is the number of rays shot from the source. Travel-time parameters are computed and assigned to each image point by projection from at least one nearby, known wavefront/ray-trajectory intersection that resides in the same and only the same velocity domain as the selected image point. The process is repeated for all image points in the selected velocity domain and for all velocity domains.

It is another feature of this invention that the calculated travel time which maximizes the total energy is selected for assignment to a preselected image point when more than one travel time is found to have been assigned to that image point.

In accordance with another aspect of this invention, the shortest calculated travel time is selected for assignment to a preselected image point when more than one travel time is found to have been assigned to that image point.

BRIEF DESCRIPTION OF THE DRAWINGS

The novel features which are believe to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
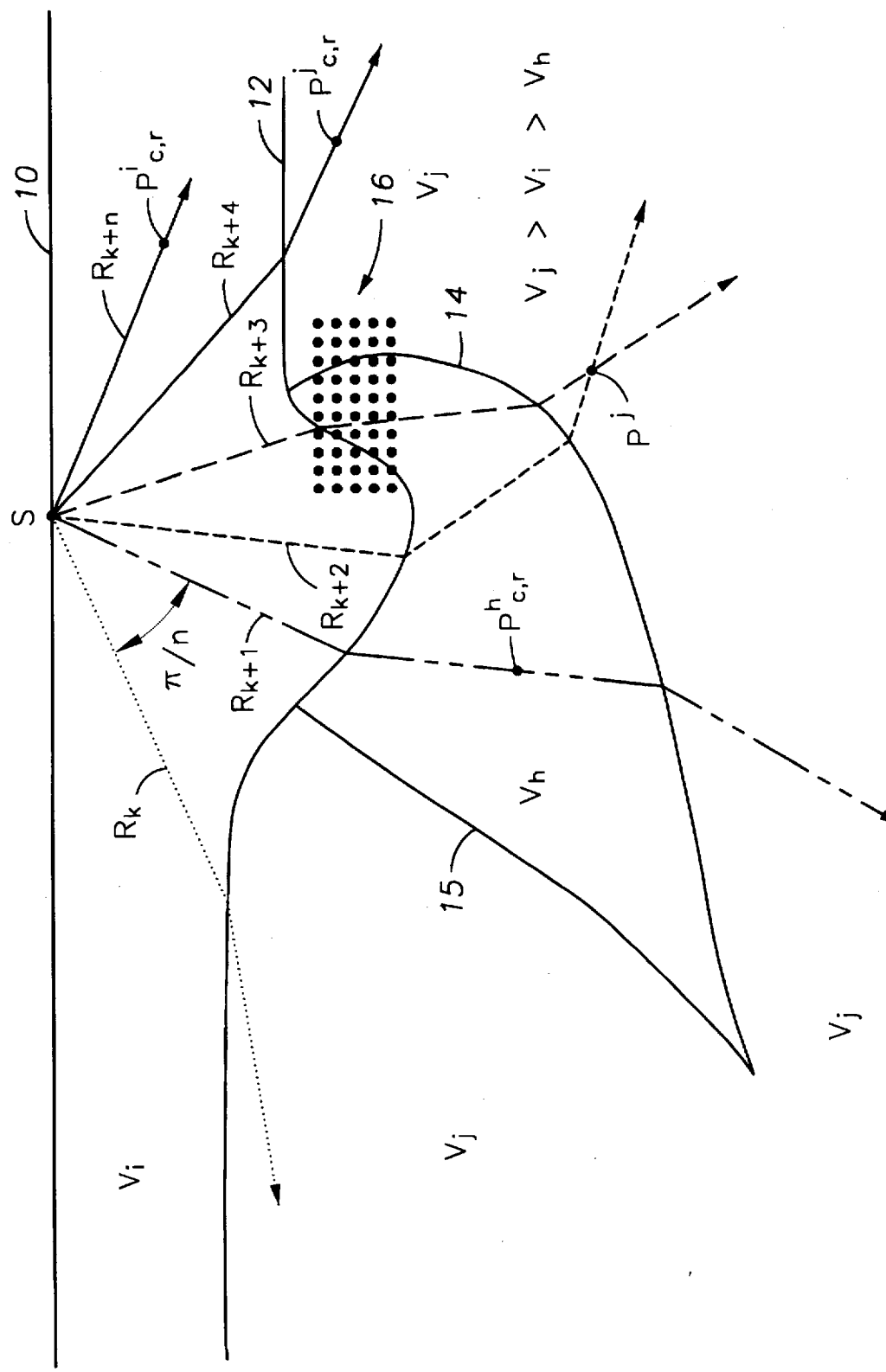
FIG. 1 is a cross section of a velocity model of the earth illustrating velocity discontinuities and symbol nomenclature.

FIG. 1 is an example of a velocity model associated with the earth layering in a region of interest, the surface of which is represented by line 10. Between surface 10 and a velocity interface 12, lies an earth layer characterized by velocity $V_i$. The simple term "velocity", unless otherwise qualified, means the velocity of a sound wave propagating through the material of an earth layer under consideration.

Velocity discontinuity 12 separates layer $V_i$ from an underlying earth layer characterized by velocity $V_j$. A lens of material, characterized by a very low velocity $V_h$, is outlined by velocity interfaces 14 and 15. The relative magnitudes of the respective velocities are defined by the inequality $V_j > V_i > V_h$.

An exemplary 10×5 array, 16, of regularly-spaced pixels, $P^x_{c,r}$ is superimposed on the velocity model of FIG. 1. Some practitioners of the art refer to the pixels by the term "grid points". For many processes such as migration and modeling, the travel time from point S to each of the output grid points is required. In real life, array 16 would include the entire portion of the earth cross-section of interest but is shown as a limited area in FIG. 1 to avoid complicating the drawings. Preferably the separation between the pixels is on the order of a multiple of the separation between surface acoustic sources.

Individual pixels are identified by the layer index, x (x=h, i, j, ...), identifying the velocity domain in which the pixel, $P^x$, resides and by its location in the array by the column number, c, and row number, r, counting from the upper left hand corner of an array such as 16, referred to hereinafter as the grid-point ID (array element identifier). The symbol, x, the layer index is not to be interpreted as an exponent in the usual sense. Thus, $P^j_{2,3}$ refers to a pixel or grid point in velocity domain $V_j$, located at column 2, row 3 within array 16. Similarly, pixel $P^j_{10,2}$ resides in velocity domain $V_j$, column 10, row 2.

Given an initial velocity model, the task is to assign a travel time to each pixel or grid point which represents an output image point in the array for use in migrating the seismic data to provide a structural model of the subsurface. To do that, the pixel array is overlaid by a wavefront map. We proceed thus:

Following conventional practice, in FIG. 1, a fan of rays $R_k$(k=1,2,3, ..., n-1) is shot from a surface source, S. The angular separation of the rays is $\pi$n radian where n is some arbitrary number such as 50 by way of example but not by way of limitation (that number may be used for 2-D operations but many more may be used in 3-D work).

Within a given velocity domain, the ray paths in FIG. 1 are shown as being straight-line segments for simplicity although in reality, they are curved. At a velocity discontinuity such as 12, the ray path is refracted in accordance with Snell's law. In the case where $V_j > V_i$, a ray bends away from the normal to the plane of the discontinuity as shown for a generic ray $R_{K+4}$ (that is a ray without a velocity-field identifier) represented by a solid line, where K is the index of some arbitrarily-selected ray from the set of rays $R_k$.

In a case such as where $V_h < V_i$, a ray refracts towards the normal to the plane of the discontinuity as shown for rays $R_{K+3}$ (long dashes) and $R_{K+2}$ (short dashes). In the case of those rays, the intersecting rays may exhibit a focussing effect at certain locations such as at P' due to the negative velocity gradient across the interfaces 12 and 14 and their local geometry.

From FIG. 1, it is evident that rays $R_{K+2}$ to $R_{K+n}$ are associated with wavefields propagating generally to the north or east whereas rays $R_K$–$R_{K+1}$ extend in the opposite direction.

In accordance with conventional practice, wavefronts are constructed by any well-known means and mapped on a velocity model such as that of FIG. 1. Please now refer to FIG. 2 which illustrates ray paths $R^x_{L(\pi/n)}$ (L=1,2,3,...,n-1) extending across a velocity interface 20, where x, the layer index, identifies the velocity domain which a segment of the raypath traverses. The vertical axis is depth in meters or feet; the horizontal axis is offset distance from a source as measured in similar units.

Figure 2:
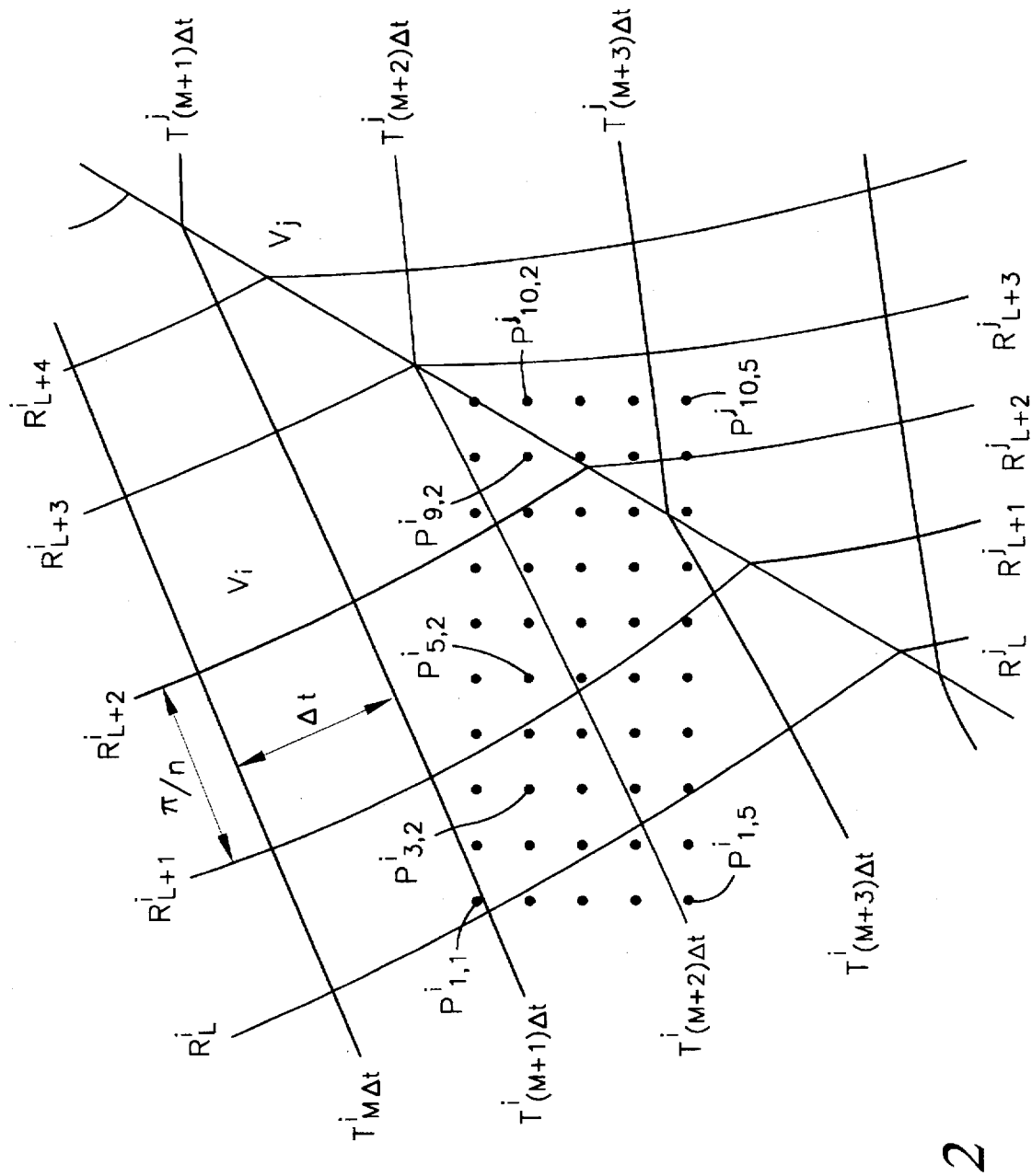
FIG. 2 illustrates the method of this invention as applied in assigning travel times to a regular array of output image points in the vicinity of a velocity discontinuity.

Wavefronts are drawn for travel times $T^x_{(m+p)\Delta t}$ are constructed orthogonal to the rays at the intersections. The wavefronts represent travel times along the respective ray paths. The time increment, $\Delta t$, between wavefronts may be, but is not limited to, 0.050 second. That interval separates the wavefronts by about 500 feet at the subsurface velocities often encountered. The travel time $T^x$ for a selected wavefront is identified by a layer index x, (x=h,i,j ...) and a time-increment multiple, m (m=0,1,2, ..., $T_{max}/\Delta t$), where $T_{max}$ is the maximum travel time expected in the region of interest. Thus, the first wavefront illustrated to the upper left of discontinuity 20 in FIG. 2 is $T^i_{M\Delta t}$. The next wavefront is $T^i_{(M+i)\Delta t}$, etc. On the other side of 20 the first wavefront $T^i_{M\Delta t}$ is refracted to become $T^j_{M\Delta t}$. M is the index of some wavefront arbitrarily selected from the set of m wavefronts $T^x_m$.

The time increment between wavefronts is a constant, $\Delta t$. However, the velocity model is plotted in terms of depth. Therefore the spacing between wavefronts on a depth map depends upon the velocity. Because $V_j$ is greater than $V_i$, the spacing of the wavefronts as measured along the ray paths is greater on the $V_j$ side of the interface 20 than on the left hand side in the $V_i$ domain.

In the far field, the ray paths and the wavefronts can be represented locally by straight line segments without significant error, thereby simplifying calculations. However, curvature corrections can be introduced if desired, using and one of several well-known algorithms.

The mapped ray paths and associated wavefronts as shown in FIG. 2 define discrete travel time cells. For example, $P^i_{3,2}$ resides in a travel-time cell bounded by ray paths $R^i_L$, $R^i_{L+1}$ and wavefronts $T^i_{(M+1)\Delta t}$, $T^i_{(M+2)\Delta t}$. As before stated, the angular separation between ray paths may be some desired angle such as $\pi/50$. In the far field where the rays diverge substantially, making the travel time cells excessively wide, to retain the desired resolution between ray paths, additional ray paths may be inserted. An upper limit for a cell width may be on the order of 1500 feet but it is not critical.

In the event that an interface cuts across a traveltime cell having boundaries as above defined, the interface itself becomes an additional de facto boundary. The interface divides the original traveltime cell into two parts, each part having a separate layer index within which the travel times must be individually projected.

An image point is assigned a travel time τ by a weighted (i.e., a scaled) projection from a known nearby wavefront location such as $T^i_{(M+1)\Delta t}$. The term "nearby" is defined to mean a wavefront that is separated from the selected pixel or grid point by a space equal to or less than the wavefront increment $\Delta t$ multiplied by the local velocity, with the additional condition that the layer index of the wavefront matches that of the image point.

For example the travel time $\tau^i_{5,2}$ to be assigned to $P^i_{5,2}$ may be found by simple interpolation along a trajectory parallel to ray path $R_{L+1}$, between wavefronts $T^i_{(M+1)\Delta t}$ and $T^i_{(M+2)\Delta t}$. The travel time $\tau^i_{9,2}$ assigned to image point $P^i_{9,2}$ could be found by extrapolation from nearby wavefront $T^i_{(M+2)\Delta t}$. But the traveltime $\tau^j_{10,2}$ to be assigned to $P^j_{10,2}$, across discontinuity 12 from $P^i_{9,2}$, must be extrapolated from $T^j_{(M+3)\Delta t}$ on the $V_j$ side, not projected from the wavefront used for $P^i_{9,2}$ on the $V_i$ side because that wavefront does not qualify as being "nearby". Thus, it is required that all processes and parameters associated with a selected output image point must be characterized by a common layer index.

Thus, in the practice of this invention, a velocity model is provided that includes a regular array of output image points superimposed thereon. A set of sparsely-distributed ray-path trajectories and concomitant wavefronts is mapped over the velocity model. The velocity domain in which the image points and wavefronts reside is identified by appropriate layer indices. Travel times to be assigned to a selected output image point contained within confines of the travel time cell are projected from a nearby wavefront whose layer index matches that of the selected output image point.

In the above examples, is was assumed ideally that each output image point was assigned only a single travel time associated with a single travel-time trajectory. In the real world, multiple travel paths are possible as is shown by the focussing effect in FIG. 1 for some location $P^i$ previously mentioned. When more than one travel time is found to have been assigned to the same image point, the travel time event exhibiting the maximum energy is chosen. The selection is based on the assumption that energy becomes dissipated at longer travel times because of the inverse spreading concept. Alternatively, at the option of the interpreter, the event having the least travel time is selected for output.

Because of the massive amounts of data involved in processing seismic data, this invention is best practiced with the aid of a properly programmed computer. The computer carries out the required processing and display of the resulting model. The best mode of operation is best taught by means of a flow diagram as shown now by FIGS. 3A and 3B.

Figure 3A:
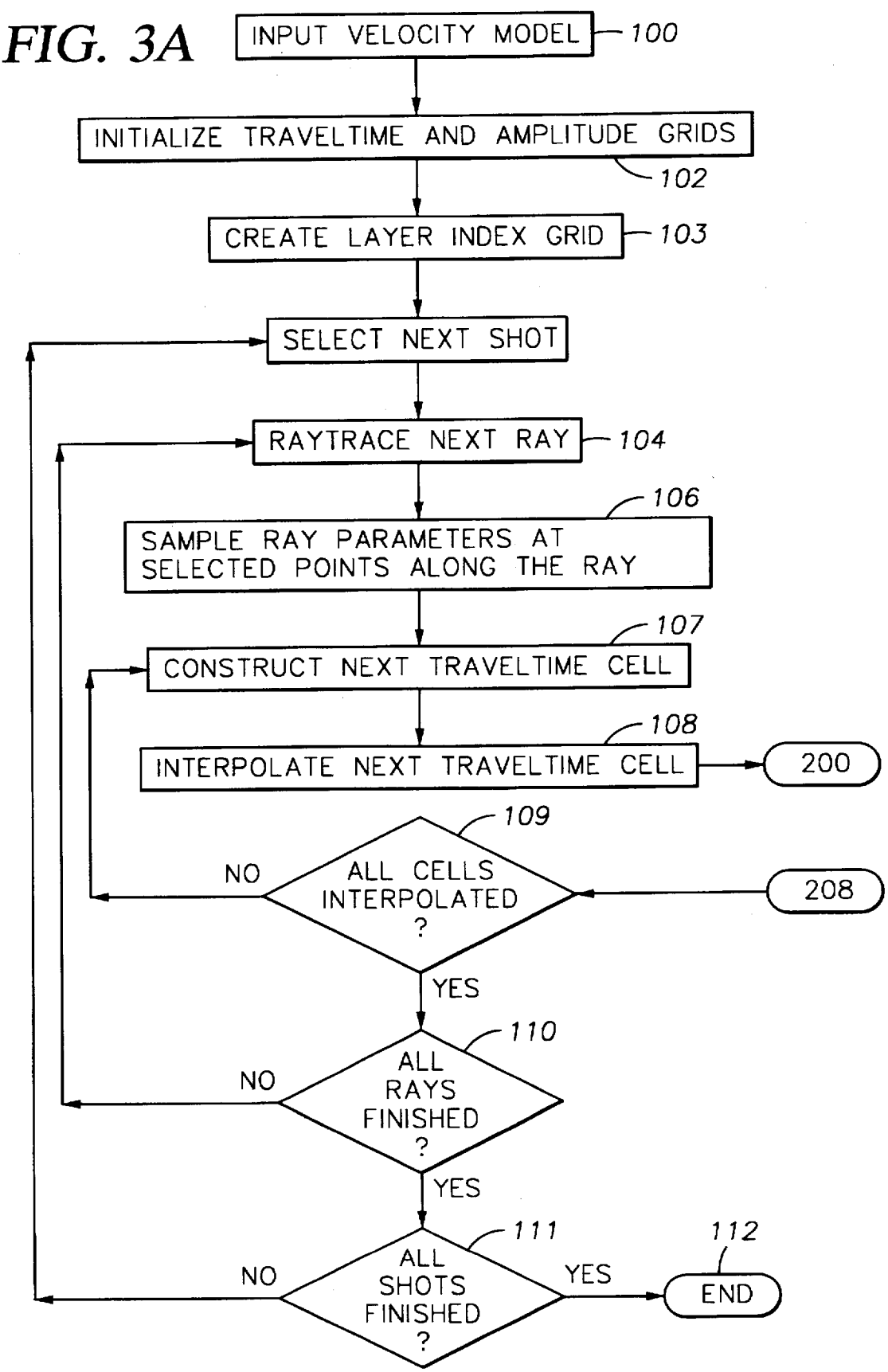
FIGS. 3A AND 3B are flow diagrams showing the process of this invention.

The initial input data for the velocity model is entered at step 101, FIG. 3A. The velocity model may be entered in any desired format. The traveltime grid, at step 102 is initiated. If the maximum energy criterion is to be employed (step 204, FIG. 3B), then in addition to the traveltime grid, an amplitude grid must be entered, initialized to some very large negative quantity.

At step 103, for each point on the traveltime grid, the appropriate layer index is stored in a separate layer index grid having the same dimensions as the traveltime grid.

For each of the surface source locations, a fan of ray paths are shot. The angular separation between rays is $\pi/n$, where n is some desired number that depends on the desired resolution of the ray-path fanout. At step 104, the first ray of the first available shot is selected. The selected ray is ray-traced at step 105.

At step 106, parameters of interest along the ray are entered. Included are traveltime, amplitude as a function of travel time, wavefront curvature are stored at selected ray control points along the ray. The ray control points preferably, but not necessarily, are distributed equally in time or space.

A travel time cell is constructed at step 107 as shown and explained earlier in connection with FIG. 2 for a 2-D. situation. A traveltime cell may also be constructed in 3-D. The traveltime cell is trapezoidal as shown in FIG. 2. The width is proportional to the local radius of curvature of the wavefront between wavefront control points. The half-width of a ray tube (that is, the zone of wavefront interpolation along any given ray path) at any point should not exceed the radius of curvature of the wavefront at that point.

Each traveltime grid point within the current traveltime cell is selected in turn at step 108 for interpolation. To perform that operation, the program switches to subroutine 200, FIG. 3B.

Figure 3B:
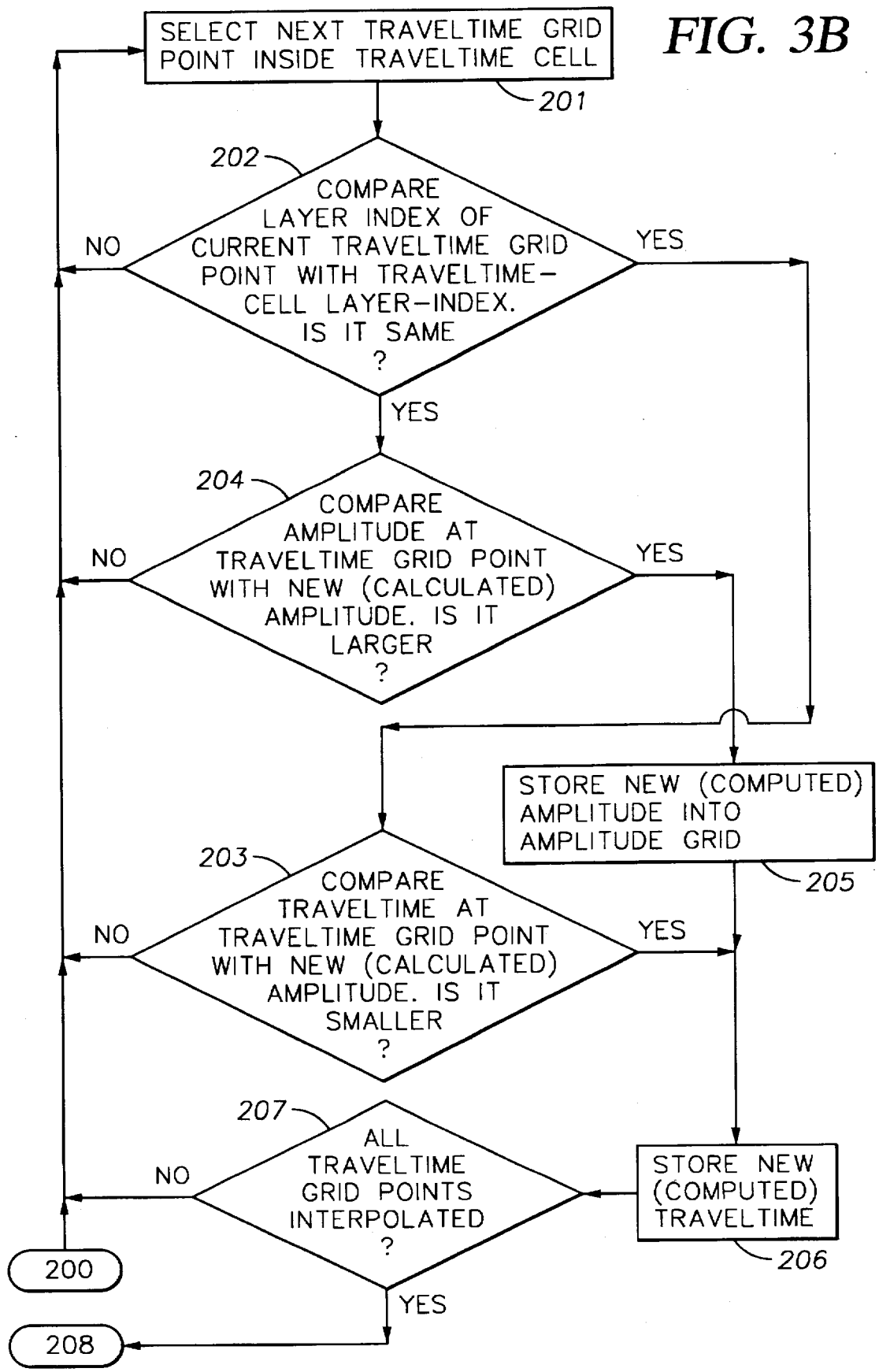

At step 201, FIG. 3B, the next available traveltime grid point is selected. The layer index of the current traveltime grid point is compared to the layer index of the traveltime cell. If the layer indices do not match such as across the interface 20, FIG. 2, the traveltime is not interpolated and the program loops back to step 201. If a match does indeed exist, the traveltime to be assigned to a traveltime grid point is interpolated between the wave fronts that bound the traveltime cell in the manner previously explained.

At step 203, the parameters of the newly computed traveltime at the selected traveltime grid point is compared with traveltime parameters, if any, that had previously been assigned to that grid point. The amplitude of the newly-interpolated traveltime sample may be compared at step 204 to the amplitude of an earlier resident, if any, of that traveltime grid point. If the amplitude is larger, it is saved in an amplitude-grid matrix at step 206. Concurrently, if the traveltime is smaller, it is accepted and stored in the traveltime grid point array. If not, the next selected traveltime grid point within the cell is selected for interpolation.

After all grid points in the traveltime cell have been tested and interpolated, the processor loops back to the main program at steps 207 and 208.

At step 109, the program iterates through all of the traveltime cells for a given ray tube. All remaining rays are processed in step 110. At step 111, all of the remaining ray-fans are processed to provide a final traveltime to be assigned to an array of output image points at step 112.

This invention has been described with a certain degree of specificity by way of example but not by way of limitation. The invention has been described in terms of a 2-D project by way of example but the principles an be readily extended to 3-D. Those skilled in the art will devise obvious variations to the examples given herein but which will fall within the scope and spirit of this invention which is limited only by the appended claims.

What is claimed is:

1. A method for assigning travel times to a plurality of output image points, superimposed as a regular array of grid points distributed over a complex velocity model including a plurality of velocity domains, for use in migrating seismic reflection data, comprising:
   i) mapping, over the velocity model, a set of sparsely-distributed ray-path trajectories radiating from each of a plurality of pre-selected surface-source locations, the ray-path trajectories having a desired angular separation;
   ii) erecting a set of wavefront segments orthogonal to the mapped ray-path trajectories, the wavefront segments being separated by a fixed desired time increment;
   iii) identifying each said output image point and each said wavefront segment with a layer index defining their respective velocity-domain residencies;
   iv) assigning a travel time to a selected output image point by projection from a nearby wavefront having a layer index that matches the layer index of said selected output image point; and
   v) repeating steps i) through iv) for all output image points.

2. The method as defined by claim 1, comprising:
   selecting for assignment to the selected output image point the travel time that maximizes the total energy when more than one travel time is found to have been assigned to that output image point.

3. The method as defined by claim 1, comprising:
   selecting the shortest travel time for assignment to said selected output image point when more than one travel time is found to have been assigned to that output image point.

4. A traveltime generator for use in migrating seismic data, comprising:
   a) providing a velocity model of the subsurface of the earth within a survey area in a region of interest, said velocity model including at least one velocity discontinuity forming a boundary between a plurality of velocity domains;
   b) superimposing an array of image points over the velocity model, said image points being identified as to velocity-domain residency by a layer index;
   c) mapping over the velocity model, a fan of sparsely-distributed ray-path trajectories having concomitant, spaced-apart wavefront segments constructed orthogonally thereto, identified as to velocity-domain residency by a layer index;
   d) assigning a travel time to each said image point by projection from a nearby wavefront identified by the same and only the same layer index that identifies the image point.

5. The method as defined by claim 4, wherein:
   the wavefront segments are spaced apart by a preselected constant time difference.

6. The method as defined by claim 4, comprising:
   selecting for assignment to each said image point the travel time that maximizes the total energy when more than one travel time is found to have been assigned to that image point.

7. The method as defined by claim 4, comprising:
   selecting the shortest travel time for assignment to each said image point when more than one travel time is found to have been assigned to that image point.

8. The method as defined by claim 6, comprising:
   repeating steps c) and d) a plurality of times within said survey area.

9. The method as defined by claim 7, comprising:
   repeating steps c) and d) a plurality of times within said survey area.

* * * * *